LINK & CURTIS.
Gridiron.

No. 96,930.

Patented Nov. 16, 1869.

Witnesses
R. Hirsh
Sam Duncan

Inventors
G. H. Link
C. D. Curtis
per F. A. Morley & Co
Attys

United States Patent Office.

G. H. LINK AND C. D. CURTIS, OF SYRACUSE, NEW YORK.

Letters Patent No. 96,930, dated November 16, 1869.

BROILER.

The Schedule referred to in these Letters Patent and making part of the same.

*To all whom it may concern:*

Be it known that we, G. H. LINK and C. D. CURTIS, of Syracuse, in the county of Onondaga, and State of New York, have invented a new and useful Improvement in Steak-Broilers; and we do hereby declare that the following is a full, clear, and exact description thereof, which will enable those skilled in the art to make and use the same, reference being had to the accompanying drawings, forming part of this specification, in which—

Similar letters of reference indicate like parts.

This invention relates to a certain improvement in reversible gridirons or broilers; and The invention consists in the arrangement of the grooved bars of the gridiron, as hereinafter more fully explained.

In the accompanying drawings—

A is the reversible gridiron, formed in two parts, as ordinarily.

B is the bottomless pot or rim, in which the gridiron is suspended, and

C is the removable tin cover.

Figure 1:
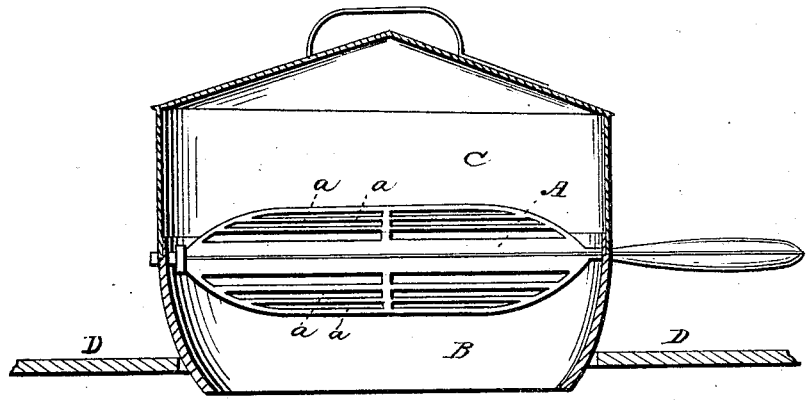
Figure 1 is a sectional side view of our improvement.

D, in fig. 1, represents the stove-plate.

Figure 2:
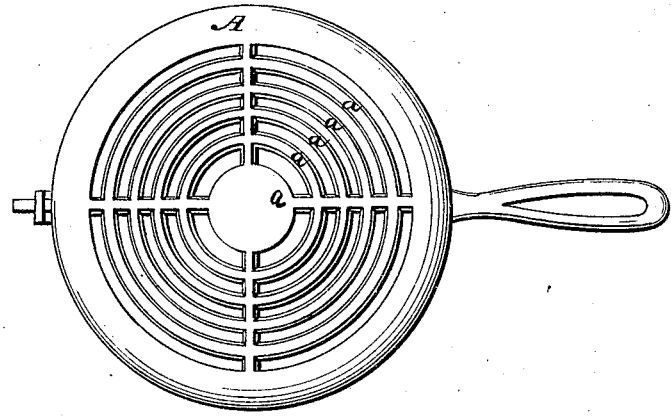
Figure 2 is a plan view of the gridiron.

We make the gridiron A of cast-iron, and cast it with grooved bars *a a a*, fig. 2, for catching the juices of the meat, so that the steak is kept moist until fully done.

These bars *a* are cast in a circular form, and arranged concentrically, as shown in fig. 2.

Having thus described our invention,

What we claim as new, and desire to secure by Letters Patent, is—

The double reversible gridiron A *a a*, in combination with the suspending-rim D and cover C, when the said bars *a a* are grooved, and made in circles, arranged concentrically, as herein shown.

The above specification of our invention signed by us, this 22d day of September, 1869.

G. H. LINK.
C. D. CURTIS.

Witnesses:
R. HIRSH,
F. A. MORLEY.